(12) United States Patent
Cao et al.

(10) Patent No.: US 10,901,971 B2
(45) Date of Patent: Jan. 26, 2021

(54) RANDOM WALKING AND CLUSTER-BASED RANDOM WALKING METHOD, APPARATUS AND DEVICE

(71) Applicant: ADVANCED NEW TECHNOLOGIES CO., LTD., Grand Cayman (KY)

(72) Inventors: Shaosheng Cao, Hangzhou (CN); Xinxing Yang, Hangzhou (CN); Jun Zhou, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/736,603

(22) Filed: Jan. 7, 2020

(65) Prior Publication Data
US 2020/0142877 A1     May 7, 2020

Related U.S. Application Data (63) Continuation of application No. PCT/CN2018/102748, filed on Aug. 28, 2018.

(30) Foreign Application Priority Data

Oct. 10, 2017    (CN) .......................... 2017 1 0932612

(51) Int. Cl.
*G06F 16/00*      (2019.01)
*G06F 16/22*      (2019.01)
(Continued)

(52) U.S. Cl.
CPC .......... *G06F 16/2255* (2019.01); *G06F 16/27* (2019.01); *G06F 16/9024* (2019.01); *H04L 67/1095* (2013.01)

(58) Field of Classification Search
CPC ............. G06F 16/2255; G06F 16/9024; G06F 16/9027
See application file for complete search history.

(56) References Cited

U.S. PATENT DOCUMENTS 6,549,896 B1    4/2003   Candan et al.
7,827,182 B1   11/2010   Panigraphy
(Continued)

FOREIGN PATENT DOCUMENTS

CN     101894123 A    11/2010
CN     103198177 B     7/2013
(Continued)

OTHER PUBLICATIONS

Taiwanese Search Report for Taiwanese Application No. 107128019, dated Jan. 21, 2020, 1 page.
(Continued)

*Primary Examiner* — Hung Q Pham (57) ABSTRACT

Embodiments of the present specification disclose random walking and a cluster-based random walking method, apparatus and device. A solution includes: obtaining information about each node included in graph data, generating, according to the information about each node, a hash table reflecting a correspondence between the node and an adjacent node of the node, and generating a random sequence according to the hash table, to implement random walking in the graph data. The solution is applicable to clusters and single machines.

17 Claims, 4 Drawing Sheets

S502
Obtain a hash table that is generated according to information about each node included in graph data, where a key of the hash table includes an identifier of a respective node, and a value of the hash table includes an identifier of an adjacent node of the respective node S504
Generate a random sequence according to the hash table, where the random sequence reflects random walks in the graph data (51) Int. Cl.
    *G06F 16/27*     (2019.01)
    *G06F 16/901*    (2019.01)
    *H04L 29/08*     (2006.01)

(56) References Cited

U.S. PATENT DOCUMENTS

| | | | |
|---|---|---|---|
| 8,073,832 B2* | 12/2011 | Gollapudi | G06F 16/9024 |
| | | | 707/706 |
| 8,122,419 B2 | 2/2012 | Elfadel et al. | |
| 8,156,129 B2 | 4/2012 | Zhou et al. | |
| 8,396,864 B1 | 3/2013 | Harinarayan et al. | |
| 8,396,884 B2 | 3/2013 | Singh et al. | |
| 8,639,703 B2 | 1/2014 | Harinarayan et al. | |
| 8,849,830 B1 | 9/2014 | Srinivasan et al. | |
| 8,856,047 B2 | 10/2014 | Chakrabarti et al. | |
| 8,943,011 B2 | 1/2015 | Gong et al. | |
| 9,135,308 B2 | 9/2015 | Bhalotia | |
| 9,582,766 B2 | 2/2017 | Sadikov et al. | |
| 9,704,262 B2 | 7/2017 | Baloch et al. | |
| 10,304,244 B2 | 5/2019 | Chuang et al. | |
| 10,521,435 B2 | 12/2019 | Balmin et al. | |
| 2007/0203789 A1 | 8/2007 | Jain et al. | |
| 2008/0097971 A1 | 4/2008 | Chen et al. | |
| 2008/0275902 A1 | 11/2008 | Burges et al. | |
| 2009/0070873 A1 | 3/2009 | McAfee et al. | |
| 2010/0281022 A1 | 11/2010 | Gollapudi et al. | |
| 2011/0035464 A1 | 2/2011 | Dolin et al. | |
| 2012/0096042 A1 | 4/2012 | Brockett et al. | |
| 2012/0278261 A1 | 11/2012 | Lin et al. | |
| 2012/0330864 A1 | 12/2012 | Chakrabarti et al. | |
| 2013/0151536 A1 | 6/2013 | Akoglu et al. | |
| 2014/0317736 A1 | 10/2014 | Cao et al. | |
| 2015/0032767 A1 | 1/2015 | Gao et al. | |
| 2016/0232254 A1 | 8/2016 | Chehreghani | |
| 2017/0195188 A1* | 7/2017 | Bennett | H04L 67/2842 |
| 2018/0137155 A1 | 5/2018 | Majumdar | |
| 2019/0066054 A1 | 2/2019 | Kenthapadi et al. | |
| 2019/0114373 A1 | 4/2019 | Subbian et al. | |
| 2020/0004902 A1 | 1/2020 | Aimone et al. | |
| 2020/0005120 A1 | 1/2020 | Aimone et al. | |

FOREIGN PATENT DOCUMENTS

| | | |
|---|---|---|
| CN | 103699617 A | 4/2014 |
| CN | 104063507 A | 9/2014 |
| CN | 104158840 A | 11/2014 |
| CN | 104462374 A | 3/2015 |
| CN | 105659225 A | 6/2016 |
| CN | 105741175 A | 7/2016 |
| CN | 106777284 A | 5/2017 |
| CN | 106844426 A | 6/2017 |
| CN | 106991133 A | 7/2017 |
| CN | 107145977 A | 9/2017 |
| CN | 107179940 A | 9/2017 |
| CN | 107248095 A | 10/2017 |
| CN | 109934306 A | 6/2019 |
| EP | 2994826 B1 | 8/2019 |
| TW | 200420151 A | 10/2004 |
| TW | 200837584 A | 9/2008 |
| TW | 200925924 A | 6/2009 |
| TW | 201019143 A | 5/2010 |
| TW | 201439789 A | 10/2014 |
| WO | 2007100834 A2 | 9/2007 |
| WO | 2019178155 A1 | 9/2019 |

OTHER PUBLICATIONS

First Search Report for Chinese Application No. 201710932631.0, dated Dec. 24, 2019, 2 pages.
First Office Action for Chinese Application No. 201710932631.0, dated Jan. 3, 2020, 7 pages.
Supplementary Search Report for Chinese Application No. 201710932631.0, dated Jan. 15, 2020, 1 page.
International Search Report and Written Opinion of the International Searching Authority for International Application No. PCT/CN2018/104922, with partial machine English translation, dated Nov. 28, 2018, 8 pages.
Bian, Mengyang et al., " Recommendation Method Based on Random Walk on Graph Integrated with FP-Growth", Computer Science, vol. 6, No. (44), pp. 232-236, Jun. 2017.
First Search Report for Taiwanese Application No. 107128022, dated Jun. 11, 2019, 1 page.
First Search Report for Chinese Application No. 201710932612.8, dated Jan. 2, 2020, 1 page.
First Office Action for Chinese Application No. 201710932612.8, dated Jan. 10, 2020, 8 pages.
Supplementary Search Report for Chinese Application No. 201710932612.8, dated Feb. 13, 2020, 1 page.
International Search Report and Written Opinion of the International Searching Authority for International Application No. PCT/CN2018/102748, with partial machine English translation, dated Oct. 31, 2018, 8 pages.
Preinterview First Office Action for U.S. Appl. No. 16/736,673 dated Mar. 9, 2020.
Second Office Action for Chinese Application No. 201710932631.0 dated Feb. 21, 2020.
Second Office Action for Chinese Application No. 201710932612.8 dated Feb. 18, 2020.
Notice of Allowance for U.S. Appl. No. 16/736,673 dated May 15, 2020.
Gardner, Matt, et al. "Incorporating vector space similarity in random walk inference over knowledge bases." Proceedings of the 2014 conference on empirical methods in natural language processing (EMNLP). 2014.
Yen, Luh, et al. "Clustering using a random walk based distance measure." ESANN. 2005.
Franti, Pasi, Olli Virmajoki, and Ville Hautamaki. "Fast agglomerative clustering using a k-nearest neighbor graph." IEEE transactions on pattern analysis and machine intelligence 28.11 (2006): 1875-1881.
Search Report for European Application No. 18865577.3 dated Apr. 9, 2020.
International Preliminary Report on Patentability Chapter I for PCT Application No. PCT/CN2018/104922 dated Apr. 23, 2020.
International Preliminary Report on Patentability Chapter I for PCT Application No. PCT/CN2018/102748 dated Apr. 23, 2020.
Search Report for European Application No. 18865436.2 dated Jul. 31, 2020.
Qin Liu et al., "PowerWalk: Scalable Personalized PageRank via Random Walks with Vertex-Centric Decomposition," Aug. 22, 2016.
Aapo Kyrola, "DrunkardMob: billions of random walks on just a PC," Proceedings of the 7th ACM Conference on Recommender Systems, Jan. 1, 2013.
Anonymous, "Adjacency list—Wikipedia," Feb. 8, 2016.

* cited by examiner

RANDOM WALKING AND CLUSTER-BASED RANDOM WALKING METHOD, APPARATUS AND DEVICE

CROSS REFERENCE TO RELATED APPLICATIONS

This application is a continuation application of International Application No. PCT/CN2018/102748, filed on Aug. 28, 2018, which claims priority to and benefits of Chinese Patent Application No. 201710932612.8 filed on Oct. 10, 2017. The contents of the above-referenced applications are incorporated herein by reference in their entirety.

TECHNICAL FIELD

The present specification relates to the field of computer software technologies, and in particular, to random walking and a cluster-based random walking method, apparatus and device.

BACKGROUND

With the rapid development of computer and Internet technologies, many services can be performed on the Internet. Graph computing is a common means for processing social online services.

For example, for identification of fraud on accounts in a social risk control service, each user is considered as a node. If there is a transfer relationship between two users, a line is present between two corresponding nodes. The line may be directionless, or may be directed according to a transfer direction. In this way, graph data including a plurality of nodes and lines may be obtained, to perform graph computing based on the graph data to implement risk control.

A random walk algorithm is a relatively basic and important part of graph computing, and provides support for an upper-level complex algorithm. In existing technologies, the following random walk algorithm is generally used: Any node included in graph data is read in a database, any adjacent node of the node is further read in the database, to implement random walking in the graph data.

Based on the existing technologies, a more efficient random walking solution applicable to large-scale graph data is needed.

SUMMARY

Embodiments of the present specification provide random walking and a cluster-based random walking method, apparatus and device, to resolve the following technical problem: a more efficient random walking solution applicable to large-scale graph data is needed.

To resolve the foregoing technical problem, the embodiments of the present specification are implemented as follows:

An embodiment of the present specification provides a cluster-based random walking method. The method includes: obtaining, by the cluster, information about each node included in graph data. A hash table is generated according to the information about each node, where a key of the hash table includes an identifier of the node, and a value of the hash table includes an identifier of an adjacent node of the node. A random sequence is generated according to the hash table. The random sequence reflects random walks in the graph data.

An embodiment of the present specification provides a random walking method. The method includes: obtaining a hash table that is generated according to information about each node, where a key of the hash table includes an identifier of a respective node, and a value of the hash table includes an identifier of an adjacent node of the respective node. A random sequence is generated according to the hash table, where the random sequence reflects random walks in the graph data.

An embodiment of the present specification provides a cluster-based random walking apparatus. The apparatus belongs to a cluster and includes: an obtaining module, for obtaining information about each node included in graph data; a first generation module, for generating a hash table according to the information about each node, where a key of the hash table includes an identifier of the node, and a value of the hash table includes an identifier of an adjacent node of a respective node; and a second generation module, for generating a random sequence according to the hash table, where the random sequence reflects random walks in the graph data.

An embodiment of the present specification provides a random walking apparatus. The apparatus includes: an obtaining module, for obtaining a hash table that is generated according to information about each node, where a key of the hash table includes an identifier of a respective node, and a value of the hash table includes an identifier of an adjacent node of the respective node; and a generation module, for generating a random sequence according to the hash table, where the random sequence reflects random walks in the graph data.

An embodiment of the present specification provides a cluster-based random walking device. The device belongs to the cluster, and includes at least one processor and a memory communicatively connected to the at least one processor. The memory stores an instruction executable by the at least one processor. The instruction is executed by the at least one processor to enable the at least one processor to: obtain information about each node included in graph data; generate a hash table according to the information about each node, where a key of the hash table includes an identifier of a respective node, and a value of the hash table includes an identifier of an adjacent node of the respective node; and generate a random sequence according to the hash table, where the random sequence reflects random walks in the graph data.

An embodiment of the present specification provides a random walking device. The device includes at least one processor and a memory communicatively connected to the at least one processor. The memory stores an instruction executable by the at least one processor. The instruction is executed by the at least one processor to enable the at least one processor to: obtain a hash table that is generated according to information about each node, where a key of the hash table includes an identifier of a respective node, and a value of the hash table includes an identifier of an adjacent node of the respective node; and generate a random sequence according to the hash table, where the random sequence reflects random walks in the graph data.

An embodiment of the present specification provides a non-transitory computer-readable storage medium. The non-transitory computer-readable storage medium stores instructions which, when executed by a processor, cause the processor to perform operations including: obtaining, by a cluster, information about each node included in graph data; generating a hash table according to the information about each node, wherein a key of the hash table comprises an identifier of a respective node, and a value of the hash table comprises an identifier of an adjacent node of the respective node; and generating a random sequence according to the hash table, wherein the random sequence reflects random walks in the graph data.

The foregoing at least one technical solution used in the embodiments of the present specification can achieve the following beneficial effects: a database originally storing the graph data is accessed less, the hash table is independent of the database after generated, and an adjacent node of a node can be quickly retrieved by using the hash table. The solution is applicable to large-scale graph data and is relatively efficient, and can be more efficient when implemented based on a cluster.

BRIEF DESCRIPTION OF THE DRAWINGS

To describe the technical solutions in the embodiments of this specification or in the prior art more clearly, the following briefly introduces the accompanying drawings required for describing the embodiments or the prior art. Apparently, the accompanying drawings in the following description show merely some embodiments of this specification, and a person of ordinary skill in the art may still derive other drawings from these accompanying drawings without creative efforts.

DETAILED DESCRIPTION OF THE EMBODIMENTS

Embodiments of the present specification provide random walking and a cluster-based random walking method, apparatus and device.

To enable a person skilled in the art to better understand the technical solutions in this specification, the technical solutions of the embodiments of this specification will be described clearly and thoroughly below with reference to the accompanying drawings of the embodiments of this specification. Apparently, the described embodiments are merely some rather than all of the embodiments of this application. Other variations may be obtained by a person of ordinary skill in the art based on the embodiments of this specification without creative efforts and shall fall within the protection scope of this application.

A solution of the present specification is applicable to clusters and individual machines. Cluster-based processing of large-scale graph data is more efficient because a task (for example, a data reading task or a data synchronization task) can be split and a plurality of machines in the cluster can concurrently execute task parts assigned to them. The following embodiments are mainly described based on a cluster scenario.

The solution may involve one or more clusters. For example, two clusters are involved in FIG. 1.

Figure 1:
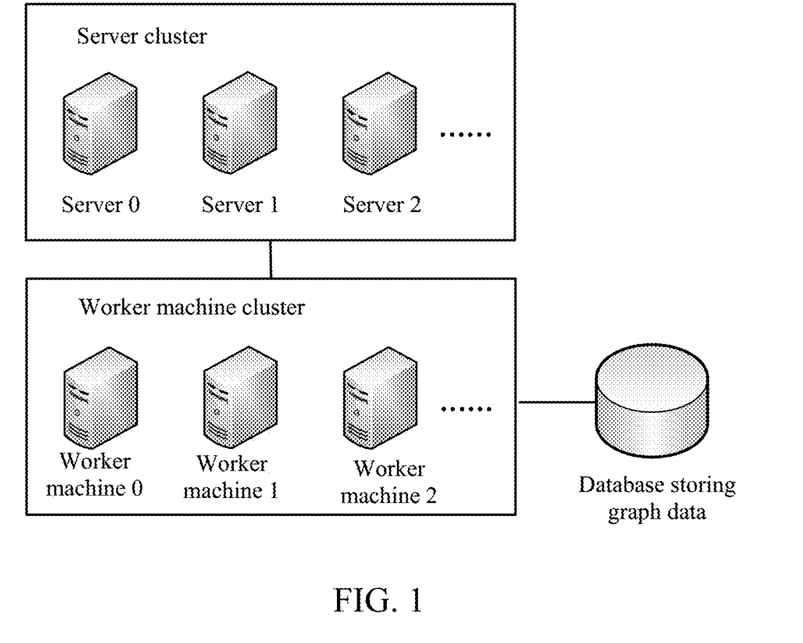
FIG. 1 is a schematic diagram of an overall architecture of a solution of the present specification in an actual application scenario.

FIG. 1 is a schematic diagram of an overall architecture of a solution of the present specification in an actual application scenario. The overall architecture mainly includes three parts: a server cluster, a worker machine cluster, and a database. The database stores graph data for the cluster to read. The server cluster cooperates with the worker machine cluster, to implement random walking in the graph data according to data read from the database.

The architecture in FIG. 1 is shown as an example. For example, the solution may involve one cluster, and the cluster includes at least one scheduler and a plurality of worker machines. Another solution may involve one worker machine cluster and one server. Machines involved in the solution cooperate with each other to implement random walking in the graph data.

The solution of the present specification is described below in detail.

Figure 2:
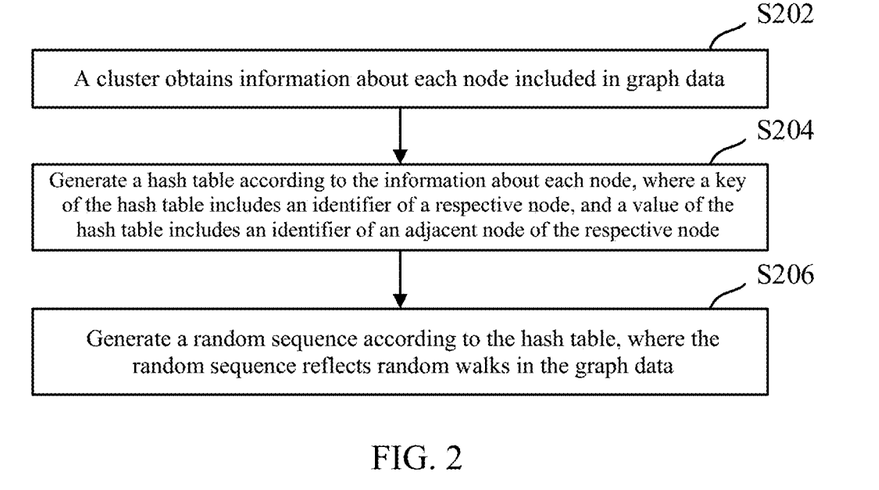
FIG. 2 is a flowchart of a cluster-based random walking method, according to an embodiment of the present specification.

FIG. 2 is a schematic flowchart of a cluster-based random walking method, according to an embodiment of the present specification. Each step in FIG. 2 is performed by at least one machine (or a program on a machine) in a cluster, and different steps may be performed by different entities.

A procedure in FIG. 2 includes the following steps:

In S202, the cluster obtains information about each node included in graph data.

In embodiments of the present specification, information about a node may include: an identifier of the node, an identifier of a node (adjacent node) adjacent/next to the node (which is used as an example in the following), or information that can represent the adjacent node of the node other than the identifier. The information about each node may be obtained at one time, or may be obtained at a plurality of times.

Generally, the original graph data is stored in a database. In this case, the information about each node is read by accessing the database. To avoid repeatedly reading data from the database and increasing the burden of the database, a plurality of machines in the cluster may respectively read information about different nodes. Further, the plurality of machines may concurrently access the database, to quickly obtain the information about the nodes.

For example, each worker machine in a worker machine cluster may concurrently read information about respective nodes from the database and process the information, and further synchronize the processed information to a server cluster. Alternatively, each worker machine may directly synchronize the read information about the nodes to the server cluster for further processing. The processing includes at least generating a hash table.

In S204, a hash table is generated according to the information about each node, where a key of the hash table includes an identifier of a respective node, and a value of the hash table includes an identifier of an adjacent node of the respective node.

In embodiments of the present specification, an identifier of a node and an identifier of an adjacent node of the node may constitute a key-value pair in the hash table. Accordingly, an identifier of an adjacent node of a node can be quickly retrieved according to the hash table and an identifier of the node, to facilitate efficient random walking in the graph data.

To support a hash operation performed during retrieval, identifiers of nodes are preferably numbers. For example, magnitudes of the identifiers of the nodes are used to define an order of the nodes. Starting from 0, a node ranking first has an identifier of 0, a node ranking second has an identifier 1, and so on. The following embodiments are described based on the definition in this example.

Certainly, if original identifiers of the nodes are not numbers, the original identifiers may be mapped to numbers based on a one-to-one mapping rule, to generate the hash table.

In embodiments of the present specification, a node may have a plurality of adjacent nodes, a value in a corresponding key-value pair in the hash table may correspondingly include identifiers of the plurality of adjacent nodes. In the hash table, a data structure that can accommodate a plurality of elements, such as an array or a linked list, may be used to store the value. In this way, it can be convenient to retrieve an identifier of any adjacent node by using the data structure.

The array is used as an example. Each node corresponds to one array, and the array stores an identifier of each adjacent node of the corresponding node. The identifier of each adjacent node is an element in the array. An identifier of an adjacent node can be retrieved through an access operation on an array element.

In S206, a random sequence is generated according to the hash table, where the random sequence reflects random walks in the graph data.

In embodiments of the present specification, the random sequence is a sequence including identifiers of a plurality of nodes. An order of the identifiers in the random sequence is a random walking order. A maximum length of the random sequence is generally determined by a predetermined quantity of random walking steps.

After the hash table is obtained, step S206 may be independently performed a plurality of times, to obtain a plurality of independent random sequences. For example, each worker machine generates one or more random sequences according to the hash table.

With the method in FIG. 2, the database storing the graph data is accessed less frequently. The hash table after been generated is independent of the database. An adjacent node of a node can be quickly retrieved by using the hash table. The solution is applicable to large-scale graph data and is efficient, and can be more efficient as implemented based on a cluster.

Based on the method in FIG. 2, embodiments of the present specification further provide some specific implementations and extended solutions of the method. The following description is provided by using the architecture in FIG. 1 as an example.

In embodiments of the present specification, the cluster may include a server cluster and a worker machine cluster. For S202, the obtaining, by the cluster, information about each node included in graph data may include: reading, by the worker machine cluster from a database, an identifier of an adjacent node of each node included in the graph data, where each worker machine reads identifiers of adjacent nodes of some nodes. It should be noted that, if the worker machine cluster does not know an identifier of a node, the worker machine cluster may read the identifier of a node, and read an identifier of an adjacent node of the node according to the identifier (as a primary key in the database) of the node.

For example, it is assumed that there are five nodes with identifiers 0 to 4. The worker machine cluster includes a worker machine 0, a worker machine 1, and a worker machine 2. Each worker machine reads identifiers of adjacent nodes of some nodes from the database. For example, the worker machine 0 reads identifiers (0 and 2) of the nodes adjacent to the node 1 and identifiers (1, 3, and 4) of the nodes adjacent to the node 2; the worker machine 1 reads an identifier (1) of an adjacent node of the node 0; and the worker machine 2 reads identifiers (2 and 4) of adjacent nodes of the node 3 and identifiers (2 and 3) of the nodes adjacent to the node 4.

In embodiments of the present specification, each worker machine may generate an incomplete hash table according to an identifier read by the worker machine and an identifier of a corresponding node of an adjacent node having an identifier that is read by the worker machine.

Further, the worker machine cluster may synchronize incomplete hash tables to the server cluster. Accordingly, the server cluster can obtain a complete hash table from the incomplete hash tables. Specifically, the server cluster may obtain the complete hash table by integrating (for example, splitting a hash table or merging hash tables) the incomplete hash tables; or may not integrate the incomplete hash tables but consider, after the worker machine cluster completes synchronization, all synchronized data as a whole, that is, the complete hash table. Each server in the server cluster may store the complete hash table, or may store only a part of the complete hash table.

The hash table in step S204 may be a complete hash table, or may be an incomplete hash table. It should be noted that, if the hash table in step S204 is an incomplete hash table, subsequent random walking is correspondingly performed in nodes involved in the incomplete hash table (the nodes are only some nodes in the graph data). Any worker machine may generate a random sequence according to an incomplete hash table generated by the worker machine without depending on the synchronization and the server cluster.

An action after the synchronization is further described. The server cluster may further synchronize the complete hash table to each worker machine, so that each worker machine can generate a random sequence according to the complete hash table.

Figure 3:
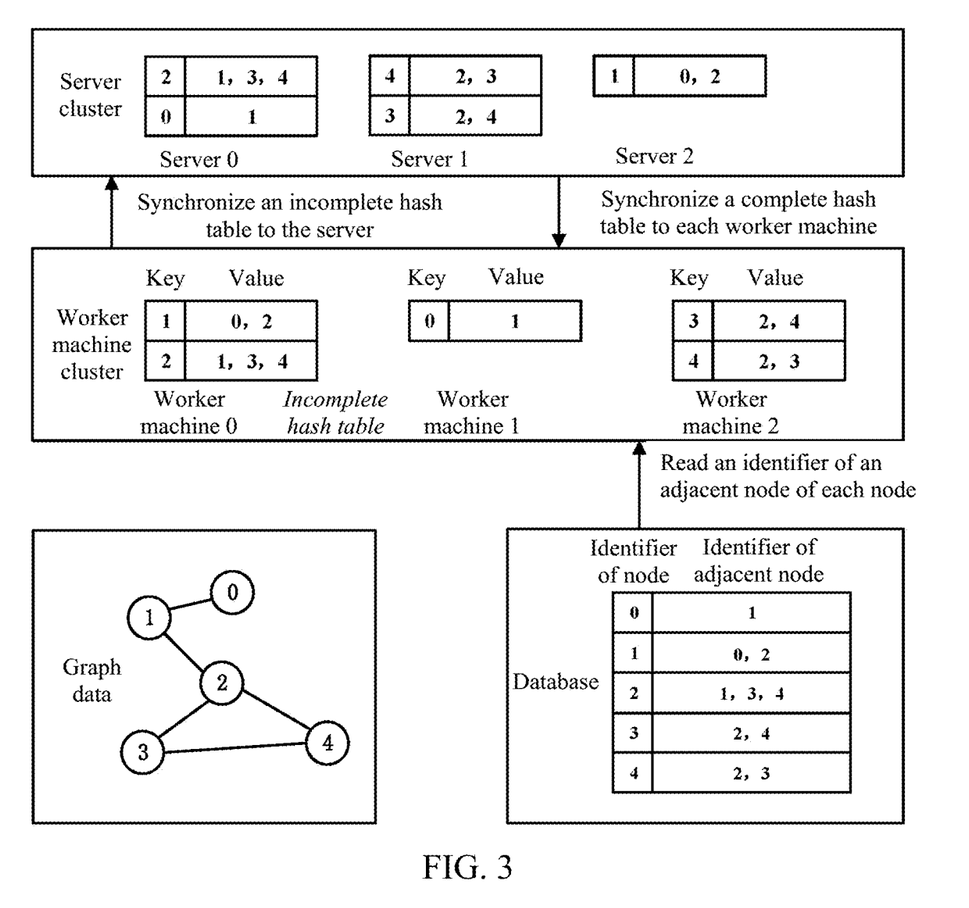
FIG. 3 is a flowchart of cluster-based hash table generation in an actual application scenario, according to an embodiment of the present specification.

A description is provided based on the foregoing example with reference to FIG. 3. FIG. 3 is a flowchart for generating a cluster-based hash table in an actual application scenario, according to an embodiment of the present specification.

In FIG. 3, a data table in the database records an identifier of an adjacent node of each node using an identifier of the node as a primary key. An adjacent node of a node 0 is a node 1. Adjacent nodes of the node 1 are the node 0 and a node 2. Adjacent nodes of the node 2 are the node 1, a node 3, and a node 4. Adjacent nodes of the node 3 are the node 2 and the node 4. Adjacent nodes of the node 4 are the node 2 and the node 3. As described above, worker machines 0 to 2 preferably may concurrently read identifiers of adjacent nodes of some nodes from the database.

Each worker machine correspondingly generates an incomplete hash table according to identifiers read by the worker machine. A hash table generated by the worker machine 0 includes two key-value pairs, a hash table generated by the worker machine 1 includes one key-value pair, and a hash table generated by the worker machine 2 includes two key-value pairs.

The worker machine cluster synchronizes all generated incomplete hash tables to the server cluster. It can be seen that the server cluster obtains a complete hash table and servers 0 to 2 each store a part of the complete hash table.

The server cluster synchronizes the complete hash table to each worker machine. Accordingly, each worker machine may independently generate a random sequence according to the complete hash table.

In embodiments of the present specification, for step S206, the generating a random sequence according to the hash table may include: (a) randomly determining, by the worker machine, an identifier of nodes as an identifier of a target node; (b) retrieving a corresponding value in the hash table using the identifier of the target node as a key, where the corresponding value includes identifiers of adjacent nodes of the target node; (c) determining a quantity of the identifiers of the adjacent nodes included in the corresponding value; (d) randomly determining a non-negative integer less than the quantity, and obtaining an identifier of a (non-negative integer)$^{th}$ adjacent node included in the corresponding value; and (e) iterating the retrieving, the determining a quantity of the identifiers of the adjacent nodes, and the randomly determining, using the (non-negative integer)$^{th}$ adjacent node as a next target node, to generate a random sequence including identifiers of target nodes obtained in sequence.

Figure 4:
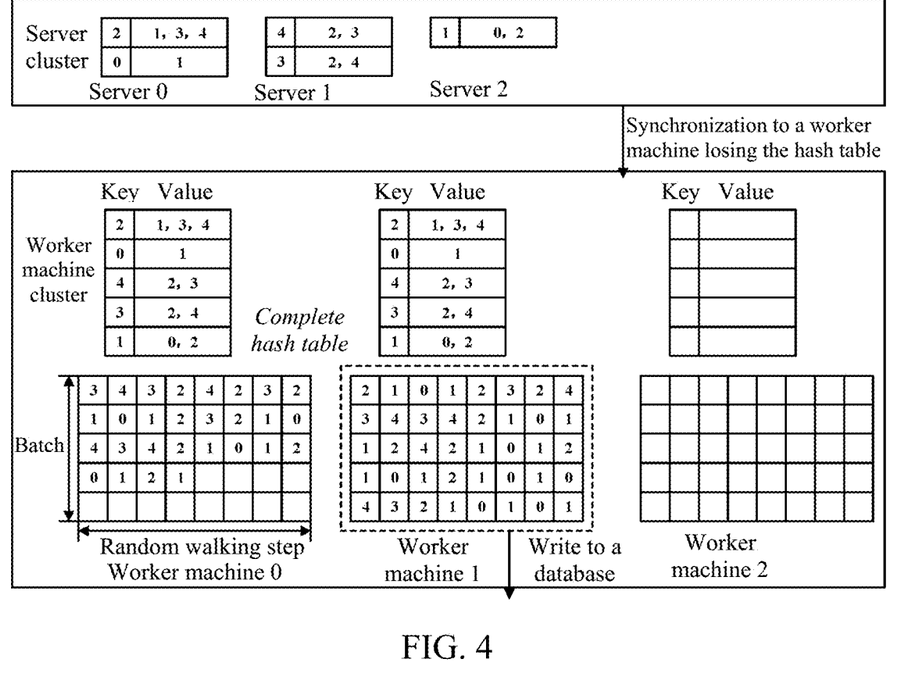
FIG. 4 is a flowchart of cluster-based random sequence generation in an actual application scenario, according to an embodiment of the present specification.

A further description based on the example of FIG. 3 is provided with reference to FIG. 4. FIG. 4 is a flowchart of cluster-based random sequence generation in an actual application scenario, according to an embodiment of the present specification.

It is assumed that the graph data includes N nodes in total, an n$^{th}$ node has an identifier n, and n starts from 0. In FIG. 4, N=5, a complete hash table correspondingly includes five key-value pairs, a value of each key-value pair is stored in an array, and an identifier of an n$^{th}$ adjacent node of a node corresponding to the key is an n$^{th}$ element of the array.

The worker machine generates an integer belonging to [0, N−1=4], that is, the worker machine determines an identifier of a target node of nodes. The worker machine retrieves a corresponding value in the complete hash table by using the identifier of the target node as a key; performs query to determine a quantity of elements included in an array storing the value, that is, a quantity of identifiers of adjacent nodes included in the value; determines a non-negative integer j less than the quantity; and obtains an identifier of a j$^{th}$ adjacent node of the target node by reading an j$^{th}$ element of the array.

It is assumed that the identifier of the target node is 2 and j=1. Then the target node is the node 2, the array is [1, 3, 4], and an obtained identifier of a first adjacent node (starting from zeroth adjacent node to the left in the array) of the target node is a first element of the array, that is, 3. Accordingly, random walking from the node 2 to the node 3 is implemented, and then the node 3 is used as a next target node for iterative calculation, to continue the random walking. In this way, identifiers of a plurality of nodes sequentially included in the random walking constitute a random sequence.

In FIG. 4, a quantity of random walking steps is preset to 8, and a quantity of batches for random sequences is preset to 5. A matrix may be used to represent the calculation results. For example, the quantity of random walking steps is a quantity of columns of the matrix, and the quantity of batches is a quantity of rows of the matrix. In this way, each row of the matrix may store a random sequence.

The quantity of random walking steps defines a maximum length of random sequences. Every time a random sequence reaches the maximum length, a next random sequence independent of the prior random sequence may be generated.

The quantity of batches defines a maximum quantity of random sequences that have been generated by each worker machine but not yet written to the database. When the maximum quantity is reached, the worker machine may write a plurality of random sequences that have been generated by the worker machine but not yet written to the database (in a form of a corresponding matrix). For example, in FIG. 5, when a plurality of random sequences that currently have been generated by the worker machine 2 but not yet written reaches the maximum quantity 5, the corresponding matrix may be written to the database.

For example, a first random sequence (3, 4, 3, 2, 4, 2, 3, 2) generated by the worker machine 0 in FIG. 4 represents a process of random walking through the following nodes: the node 3, the node 4, the node 3, the node 2, the node 4, the node 2, the node 3, and the node 2.

Further, a threshold may be preset, to limit a maximum total quantity of random sequences generated by the entire worker machine cluster. When the preset threshold is reached, each worker machine may stop generating a random sequence.

In addition, during actual application, some worker machines in the worker machine cluster may become abnormal, and lose the hash table obtained through synchronization. For example, if the worker machines store the obtained hash table only in a memory, data in the memory may be lost upon crash. In this case, when recovered to normal, the worker machines may re-obtain the lost hash table from the server cluster. The worker machine 2 in FIG. 4 is shown for this case.

The foregoing mainly describes the solution of the present specification based on a cluster scenario. The solution of the present specification is also applicable to other scenarios than the cluster scenario. For example, based on the same idea, an embodiment of the present specification further provides a random walking method, as shown in FIG. 5.

Figure 5:
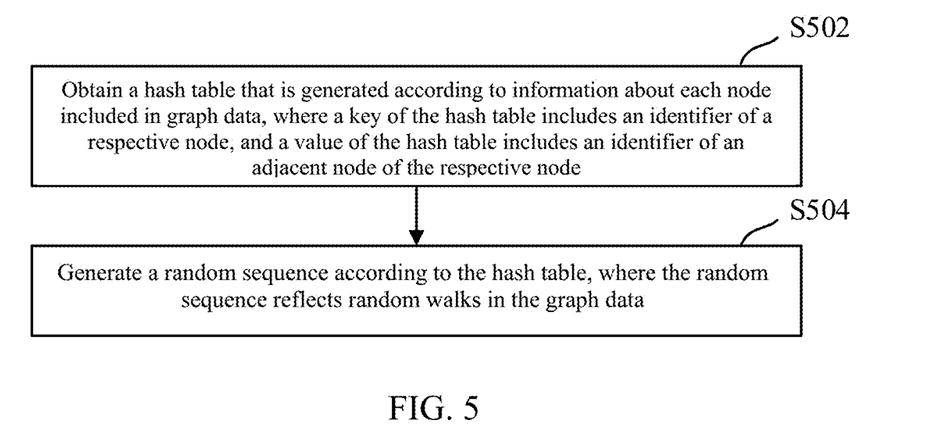
FIG. 5 is a flowchart of a random walking method, according to an embodiment of the present specification.

A procedure in FIG. 5 may be performed by a single computing device, or may be a plurality of computing devices. The procedure includes the following steps:

In S502, a computing device obtains a hash table that is generated according to information about each node, where a key of the hash table includes an identifier of a respective node, and a value of the hash table includes an identifier of an adjacent node of the respective node.

In step S502, an entity for generating the hash table is not limited in the present application. Generally, as long as the graph data is not changed, the hash table generated according to the graph data may be repeatedly used.

In S504, computing device generates a random sequence according to the hash table, where the random sequence reflects random walks in the graph data.

Figure 6:
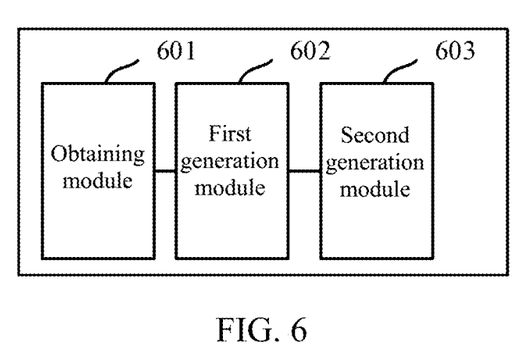
FIG. 6 is a schematic structural diagram of a cluster-based random walking apparatus corresponding to FIG. 2, according to an embodiment of the present specification.
Figure 7:
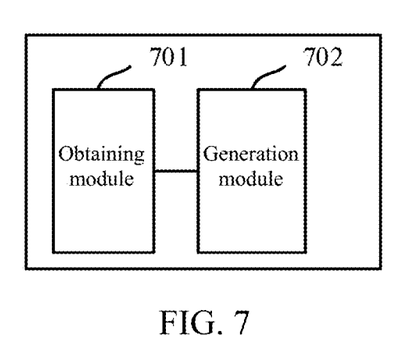
FIG. 7 is a schematic structural diagram of a random walking apparatus corresponding to FIG. 5, according to an embodiment of the present specification.

Based on the same idea, embodiments of the present specification further provide apparatuses corresponding to the foregoing methods, as shown in FIG. 6 and FIG. 7.

FIG. 6 is a schematic structural diagram of a cluster-based random walking apparatus corresponding to FIG. 2, according to an embodiment of the present specification. The apparatus belongs to the cluster, and includes: an obtaining module 601, a first generation module 602, and a second generation module 603.

The obtaining module 601 is configured for obtaining information about each node included in graph data.

The first generation module 602 is configured for generating a hash table according to the information about each node, where a key of the hash table includes an identifier of a respective node, and a value of the hash table includes an identifier of an adjacent node of the respective node.

The second generation module 603 is configured for generating a random sequence according to the hash table, where the random sequence reflects random walks in the graph data.

In some embodiments, the cluster includes a server cluster and a worker machine cluster such that the obtaining, by the obtaining module 601, information about each node included in graph data includes: reading, by the worker machine cluster from a database, an identifier of an adjacent node of each node included in the graph data, where each worker machine reads identifiers of adjacent nodes of some respective nodes.

In some embodiments, the generating, by the first generation module 602, a hash table according to the information about each node includes: generating, by each worker machine, an incomplete hash table according to an identifier read by a respective worker machine and an identifier of a corresponding node of an adjacent node having the identifier that is read by the worker machine; synchronizing, from the worker machine cluster to the server cluster, each incomplete hash table; and obtaining, by the server cluster, a complete hash table according to each incomplete hash table.

In some embodiments, before the second generation module 603 generates the random sequence according to the hash table, the server cluster synchronizes the complete hash table to each worker machine, so that each worker machine generates a random sequence according to the complete hash table.

In some embodiments, the generating, by the second generation module 603, a random sequence according to the hash table includes: (a) randomly determining, by a worker machine, an identifier of the nodes as an identifier of a target node; (b) retrieving a corresponding value in the hash table using the identifier of the target node as a key, where the corresponding value includes identifiers of adjacent nodes of the target node; (c) determining a quantity of the identifiers of the adjacent nodes included in the corresponding value; (d) randomly determining a non-negative integer less than the quantity, and obtaining an identifier of a (non-negative integer)$^{th}$ adjacent node included in the corresponding value; and (e) iterating the retrieving, the determining a quantity of the identifiers of the adjacent nodes, and the randomly determining, using the (non-negative integer)$^{th}$ adjacent node as a next target node, to generate a random sequence including identifiers of target nodes obtained in sequence.

In some embodiments, the corresponding value is stored in an array, an identifier of an n$^{th}$ adjacent node of the target node is an n$^{th}$ element of the array, and n starts from 0. When the non-negative integer is j, the obtaining, by the second generation module 603, an identifier of a (non-negative integer)$^{th}$ adjacent node included in the corresponding value includes: obtaining an identifier of a j$^{th}$ adjacent node of the target node by reading a j$^{th}$ element of the array.

In some embodiments, the generating, by the worker machine, a random sequence including identifiers of target nodes obtained in sequence includes: when a total quantity of the target nodes obtained in sequence reaches a preset quantity of random walking steps, generating, by the worker machine, the random sequence including the identifiers of the target nodes obtained in sequence.

In some embodiments, the generating, by the second generation module 603, a random sequence includes: generating, by each worker machine, a random sequence until a total quantity of generated random sequences reaches a specified threshold.

In some embodiments, if the hash table is locally lost/unavailable at a worker machine, the worker machine re-obtains the hash table from the server cluster.

FIG. 7 is a schematic structural diagram of a random walking apparatus corresponding to FIG. 5, according to an embodiment of the present specification. The apparatus includes: an obtaining module 701 and a generation module 702.

The obtaining module 701 is configured for obtaining a hash table that is generated according to information about each node, where a key of the hash table includes an identifier of a respective node, and a value of the hash table includes an identifier of an adjacent node of the respective node.

The generation module 702 is configured for generating a random sequence according to the hash table, where the random sequence reflects random walks in the graph data.

Based on the same idea, an embodiment of the present specification further provides a cluster-based random walking device corresponding to FIG. 2. The device belongs to the cluster, and includes at least one processor and a memory communicatively connected to the at least one processor. The memory stores an instruction executable by the at least one processor, and the instruction is executed by the at least one processor to enable the at least one processor to: obtain information about each node included in graph data; generate a hash table according to the information about each node, where a key of the hash table includes an identifier of a respective node, and a value of the hash table includes an identifier of an adjacent node of the respective node; and generate a random sequence according to the hash table, where the random sequence reflects random walks in the graph data.

Based on the same idea, an embodiment of the present specification further provides a random walking device corresponding to FIG. 5. The device includes at least one processor and a memory communicatively connected to the at least one processor. The memory stores an instruction executable by the at least one processor, and the instruction is executed by the at least one processor to enable the at least one processor to: obtain a hash table that is generated according to information about each node, where a key of the hash table includes an identifier of a respective node, and a value of the hash table includes an identifier of an adjacent node of the respective node; and generate a random sequence according to the hash table, where the random sequence reflects random walks in the graph data.

Based on the same idea, an embodiment of the present specification further provides a non-transitory computer storage medium corresponding to FIG. 2. The non-transitory computer storage medium stores computer executable instructions which, when executed by a processor, cause the processor to: obtain information about each node included in graph data; generate a hash table according to the information about each node, where a key of the hash table includes an identifier of a respective node, and a value of the hash table includes an identifier of an adjacent node of the respective node; and generate a random sequence according to the hash table, where the random sequence reflects random walks in the graph data.

Based on the same idea, an embodiment of the present specification further provides a non-transitory computer storage medium corresponding to FIG. 5. The non-transitory computer storage medium stores computer executable instructions which, when executed by a processor, cause the processor to: obtain a hash table that is generated according to information about each node, where a key of the hash table includes an identifier of a respective node, and a value of the hash table includes an identifier of an adjacent node of the respective node; and generate a random sequence according to the hash table, where the random sequence reflects random walks in the graph data.

Embodiments of this specification are described above. Other embodiments fall within the scope of the appended claims. In some embodiments, the actions or steps recorded in the claims may be performed in sequences different from those in the embodiments and an expected result may still be achieved. In addition, the processes depicted in the accompanying drawings do not necessarily require specific sequences or consecutive sequences to achieve an expected result. In some implementations, multitasking and parallel processing may be feasible or beneficial.

The embodiments of this specification are all described in a progressive manner, for same or similar parts in the embodiments, refer to these embodiments, and descriptions of each embodiment focus on a difference from other embodiments. Especially, an apparatus embodiment, a device embodiment, or a non-volatile computer storage medium embodiment is basically similar to a method embodiment, and therefore is described briefly; for related parts, refer to partial descriptions in the method embodiment.

The apparatus, the device, and the non-volatile computer storage medium provided in the embodiments of this specification correspond to the method, so that the apparatus, the device, and the non-volatile computer storage medium also have beneficial technical effects similar to those of the corresponding method. Since the beneficial technical effects of the method have been described in detail above, the beneficial technical effects of the corresponding apparatus, device, and non-volatile computer storage medium are not described herein again.

In the 1990s, improvements of a technology can be clearly distinguished between hardware improvements (for example, improvements to a circuit structure such as a diode, a transistor, a switch, etc.) and software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. Moreover, nowadays, instead of manually making integrated circuit chips, this programming is mostly implemented by using "logic compiler" software, which is similar to the software compiler used in program development and writing. The original code is written in a specific programming language before compiling, and this language is referred to as a hardware description language (HDL). There are various kinds of HDLs, for example, advanced Boolean expression language (ABEL), altera hardware description language (AHDL), Confluence, Cornell university programming language (CUPL), HDCal, Java hardware description language (JHDL), Lava, Lola, MyHDL, PALASM, Ruby hardware description language (RHDL), and the like. Currently, the most commonly used HDLs are very-high-speed integrated circuit hardware description language (VHDL) and Verilog. A person skilled in the art should also understand that as long as a method procedure is logically programmed and then programmed to an integrated circuit by using the foregoing hardware description languages, a hardware circuit that implements the logical method procedure can be easily obtained.

The controller can be implemented in any suitable manner, for example, the controller can take the form of, for example, a microprocessor or processor and a computer-readable medium storing computer-readable program code (for example, software or firmware) executable by the processor, a logic gate, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20 and Silicone Labs C8051F320. The memory controller can also be implemented as part of the memory control logic. A person skilled in the art will also appreciate that, in addition to implementing the controller in the form of pure computer-readable program code, it is also possible to implement the controller in the form of a logic gate, switch, application-specific integrated circuit, programmable logic controller, and embedded microcontroller and other forms to achieve the same function. Such a controller can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The system, the apparatus, the module or the unit described in the foregoing embodiments can be specifically implemented by a computer chip or an entity or implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. Certainly, in implementation of this specification, the function of the units may be implemented in a same piece of or multiple pieces of software and/or hardware.

A person skilled in the art should understand that the embodiments of this specification may be provided as a method, a system, or a computer program product. Therefore, the embodiments of this specification may use a form of hardware only embodiments, software only embodiments, or embodiments with a combination of software and hardware. Moreover, the embodiments of this specification may use a form of a computer program product that is implemented on one or more computer-usable storage media (including but not limited to a disk memory, a CD-ROM, an optical memory, and the like) that include computer-usable program code.

This specification is described with reference to the flowchart and/or block diagram of the method, device (system), and computer program product of the embodiments of this specification. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can guide a computer or another programmable data processing device to work in a specific manner, so that the instructions stored in the computer readable memory generate a product including an instruction apparatus, where the instruction apparatus implements functions specified in one or more procedures in the flowcharts and/or one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

In a typical configuration, the computer device includes one or more processors (CPUs), an input/output interface, a network interface, and a memory.

The memory may include a form such as a persistent memory, a random-access memory (RAM) and/or a non-volatile memory of computer readable media, for example, a read-only memory (ROM) or a flash memory (RAM). The memory is an example of the computer readable medium.

The computer readable medium includes a persistent medium and a non-persistent medium, a removable medium and a non-removable medium, which may implement storage of information by using any method or technology. The information may be a computer readable instruction, a data structure, a module of a program or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in the present disclosure, the computer-readable medium does not include transitory computer readable media (transitory media), such as a modulated data signal and a carrier.

It should also be noted that the terms "include", "comprise" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase "include one" does not exclude other same elements in the process, method, article or device which include the element.

This specification can be described in the general context of computer-executable instructions executed by a computer, for example, a program module. Generally, the program module includes a routine, a program, an object, a component, a data structure, and the like for executing a particular task or implementing a particular abstract data type. This specification may also be practiced in distributed computing environments in which tasks are performed by remote processing devices that are connected by using a communications network. In a distributed computing environment, the program module may be located in both local and remote computer storage media including storage devices.

The embodiments of this specification are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment.

The foregoing descriptions are merely embodiments of this specification and are not intended to limit this application. For a person skilled in the art, various modifications and variations can be made to this application. Any modification, equivalent replacement, or improvement made without departing from the spirit and principle of this application shall fall within the scope of the claims of this application.

What is claimed is:

1. A cluster-based random walking method, comprising:
obtaining, by a cluster that includes a server cluster and a worker machine cluster, information about each node included in graph data by reading, by the worker machine cluster from a database, an identifier of an adjacent node of each node included in the graph data, wherein the worker machine cluster includes a plurality of worker machines, and each of the worker machines reads at least one identifier of adjacent nodes of respective nodes;
generating a hash table according to the information about each node, wherein a key of the hash table comprises an identifier of a respective node, and a value of the hash table comprises an identifier of an adjacent node of the respective node; and
generating a random sequence according to the hash table, wherein the random sequence reflects random walks in the graph data, and the random sequence is generated by:
randomly determining, by a worker machine, an identifier of a node in the graph data as an identifier of a target node;
retrieving a corresponding value in the hash table using the identifier of the target node as a key, wherein the corresponding value comprises identifiers of adjacent nodes of the target node;
determining a quantity of the identifiers of the adjacent nodes of the target node included in the corresponding value;

randomly determining a non-negative integer less than the quantity, and obtaining an identifier of a (non-negative integer)$^{th}$ adjacent node included in the corresponding value;

by using the (non-negative integer)$^{th}$ adjacent node as the target node, iterating, until a total quantity of target nodes obtained in sequence reaches a preset quantity of random walking steps, the steps of the retrieving, the determining a quantity of the identifiers of the adjacent nodes, the randomly determining a non-negative integer less than the quantity, and the using the (non-negative integer)$^{th}$ adjacent node as the target node, to generate the random sequence comprising identifiers of the target nodes obtained in sequence; and performing the random walks on nodes of the graph data according to the generated random sequence.

2. The method according to claim 1, wherein the generating a hash table according to the information about each node comprises:

generating, by each worker machine, an incomplete hash table according to an identifier read by a respective worker machine and an identifier of a corresponding node of an adjacent node having the identifier that is read by the respective worker machine;

synchronizing, from the worker machine cluster to the server cluster, each incomplete hash table; and obtaining, by the server cluster, a complete hash table according to each incomplete hash table.

3. The method according to claim 2, wherein before the generating a random sequence according to the hash table, the method further comprises:

synchronizing, from the server cluster to each worker machine, the complete hash table, so that each worker machine generates a random sequence according to the complete hash table.

4. The method according to claim 1, wherein each corresponding value in the hash table is stored in an array, an identifier of an n$^{th}$ adjacent node of the target node is an n$^{th}$ element of the array, and n starts from 0; and the non-negative integer is j, and the obtaining an identifier of a (non-negative integer)$^{th}$ adjacent node included in the corresponding value comprises:

obtaining an identifier of a j$^{th}$ adjacent node of the target node by reading a j$^{th}$ element of the array.

5. The method according to claim 1, wherein the generating a random sequence comprises:

generating, by each worker machine, a random sequence until a total quantity of generated random sequences reaches a specified threshold.

6. The method according to claim 1, wherein the method further comprises:

if the hash table is not stored locally at a respective worker machine, re-obtaining, by the respective worker machine, the hash table from the server cluster.

7. A cluster-based random walking device, wherein the device belongs to a cluster that includes a server cluster and a worker machine cluster, wherein the worker machine cluster includes a plurality of worker machines, and the device comprises:

at least one processor; and a memory communicatively connected to the at least one processor, wherein the memory stores instructions executable by the at least one processor to cause the at least one processor to perform operations including:

obtaining information about each node included in graph data by reading, by the worker machine cluster from a database, an identifier of an adjacent node of each node included in the graph data, wherein each of the worker machines reads at least one identifier of adjacent nodes of respective nodes;

generating a hash table according to the information about each node, wherein a key of the hash table comprises an identifier of a respective node, and a value of the hash table comprises an identifier of an adjacent node of the respective node; and generating a random sequence according to the hash table, wherein the random sequence reflects random walks in the graph data, and the random sequence is generated by:

randomly determining, by a worker machine, an identifier of a node in the graph data as an identifier of a target node;

retrieving a corresponding value in the hash table using the identifier of the target node as a key, wherein the corresponding value comprises identifiers of adjacent nodes of the target node;

determining a quantity of the identifiers of the adjacent nodes of the target node included in the corresponding value;

randomly determining a non-negative integer less than the quantity, and obtaining an identifier of a (non-negative integer)$^{th}$ adjacent node included in the corresponding value;

by using the (non-negative integer)$^{th}$ adjacent node as the target node, iterating, until a total quantity of target nodes obtained in sequence reaches a preset quantity of random walking steps, the steps of the retrieving, the determining a quantity of the identifiers of the adjacent nodes, the randomly determining a non-negative integer less than the quantity, and the using the (non-negative integer)$^{th}$ adjacent node as the target node, to generate the random sequence comprising identifiers of the target nodes obtained in sequence; and performing the random walks on nodes of the graph data according to the generated random sequence.

8. The cluster-based random walking device according to claim 7, wherein the generating a hash table according to the information about each node comprises:

generating, by each worker machine, an incomplete hash table according to an identifier read by a respective worker machine and an identifier of a corresponding node of an adjacent node having the identifier that is read by the respective worker machine;

synchronizing, from the worker machine cluster to the server cluster, each incomplete hash table; and obtaining, by the server cluster, a complete hash table according to each incomplete hash table.

9. The cluster-based random walking device according to claim 8, wherein before the generating a random sequence according to the hash table, the operations further comprise:

synchronizing, from the server cluster to each worker machine, the complete hash table, so that each worker machine generates a random sequence according to the complete hash table.

10. The cluster-based random walking device according to claim 7, wherein the generating a random sequence comprises:

generating, by each worker machine, a random sequence until a total quantity of generated random sequences reaches a specified threshold.

11. The cluster-based random walking device according to claim 7, wherein the operations further comprise:

if the hash table is not stored locally at a respective worker machine, re-obtaining the hash table from the server cluster.

12. A non-transitory computer-readable storage medium storing instructions which, when executed by a processor, cause the processor to perform operations including:
    obtaining, by a cluster that includes a server cluster and a worker machine cluster, information about each node included in graph data by reading, by the worker machine cluster from a database, an identifier of an adjacent node of each node included in the graph data, wherein the worker machine cluster includes a plurality of worker machines, and each of the worker machines reads at least one identifier of adjacent nodes of respective nodes;
    generating a hash table according to the information about each node, wherein a key of the hash table comprises an identifier of a respective node, and a value of the hash table comprises an identifier of an adjacent node of the respective node; and
    generating a random sequence according to the hash table, wherein the random sequence reflects random walks in the graph data, and the random sequence is generated by:
        randomly determining, by a worker machine, an identifier of the nodes a node in the graph data as an identifier of a target node;
        retrieving a corresponding value in the hash table using the identifier of the target node as a key, wherein the corresponding value comprises identifiers of adjacent nodes of the target node;
        determining a quantity of the identifiers of the adjacent nodes of the target node included in the corresponding value;
        randomly determining a non-negative integer less than the quantity, and obtaining an identifier of a (non-negative integer)$^{th}$ adjacent node included in the corresponding value;
        by using the (non-negative integer)$^{th}$ adjacent node as the target node, iterating, until a total quantity of target nodes obtained in sequence reaches a preset quantity of random walking steps, the steps of the retrieving, the determining a quantity of the identifiers of the adjacent nodes, the randomly determining a non-negative integer less than the quantity, and the using the (non-negative integer)$^{th}$ adjacent node as the target node, to generate the random sequence comprising identifiers of the target nodes obtained in sequence; and
        performing the random walks on nodes of the graph data according to the generated random sequence.

13. The non-transitory computer-readable storage medium according to claim 12, wherein the generating a hash table according to the information about each node comprises:
    generating, by each worker machine, an incomplete hash table according to an identifier read by a respective worker machine and an identifier of a corresponding node of an adjacent node having the identifier that is read by the respective worker machine;
    synchronizing, from the worker machine cluster to the server cluster, each incomplete hash table; and
    obtaining, by the server cluster, a complete hash table according to each incomplete hash table.

14. The non-transitory computer-readable storage medium according to claim 13, wherein before the generating a random sequence according to the hash table, the instructions further cause the processor to perform:
    synchronizing, from the server cluster to each worker machine, the complete hash table, so that each worker machine generates a random sequence according to the complete hash table.

15. The non-transitory computer-readable storage medium according to claim 12, wherein each corresponding value in the hash table is stored in an array, an identifier of an n$^{th}$ adjacent node of the target node is an n$^{th}$ element of the array, and n starts from 0; and
    the non-negative integer is j, and the obtaining an identifier of a (non-negative integer)$^{th}$ adjacent node included in the corresponding value comprises:
    obtaining an identifier of a j$^{th}$ adjacent node of the target node by reading a j$^{th}$ element of the array.

16. The non-transitory computer-readable storage medium according to claim 12, wherein the generating a random sequence comprises:
    generating, by each worker machine, a random sequence until a total quantity of generated random sequences reaches a specified threshold.

17. The non-transitory computer-readable storage medium according to claim 12, wherein the instructions further cause the processor to perform:
    if the hash table is not stored locally at a respective worker machine, re-obtaining the hash table from the server cluster.

* * * * *

UNITED STATES PATENT AND TRADEMARK OFFICE
CERTIFICATE OF CORRECTION

PATENT NO. : 10,901,971 B2  
APPLICATION NO. : 16/736603  
DATED : January 26, 2021  
INVENTOR(S) : Shaosheng Cao et al.

Page 1 of 1

It is certified that error appears in the above-identified patent and that said Letters Patent is hereby corrected as shown below:

In the Claims  
Claim 12, Column 17, Line 26:  
"the nodes a node" should read -- a node --.

Signed and Sealed this  
Tenth Day of August, 2021

Drew Hirshfeld  
*Performing the Functions and Duties of the*  
*Under Secretary of Commerce for Intellectual Property and*  
*Director of the United States Patent and Trademark Office*